(12) United States Patent
Boss et al.

(10) Patent No.: US 8,103,414 B2
(45) Date of Patent: Jan. 24, 2012

(54) ADAPTIVE VEHICLE CONFIGURATION

(75) Inventors: Gregory J. Boss, American Fork, UT (US); Peter G. Finn, Brampton, CA (US); Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 12/261,424

(22) Filed: Oct. 30, 2008

(65) Prior Publication Data

US 2010/0114437 A1 May 6, 2010

(51) Int. Cl.
*B62D 5/04* (2006.01)
*G06F 19/00* (2006.01)

(52) U.S. Cl. ............ 701/48; 701/124; 180/446

(58) Field of Classification Search .......... 701/48, 701/36, 41, 124, 38, 45, 101, 55; 180/446; 177/136; 702/174
See application file for complete search history.

(56) References Cited

U.S. PATENT DOCUMENTS

| 4,333,337 | A | 6/1982 | Martin |
| 5,583,765 | A | 12/1996 | Kleehammer |
| 6,246,967 | B1 | 6/2001 | Libicki et al. |
| 7,142,102 | B2 | 11/2006 | Darroman |
| 7,826,948 | B2 * | 11/2010 | Messih et al. ............ 701/38 |
| 2003/0154798 | A1 | 8/2003 | Weyand et al. |
| 2009/0036267 | A1 * | 2/2009 | Bellinger .............. 477/97 |
| 2010/0049415 | A1 * | 2/2010 | Bauerle ............. 701/78 |

* cited by examiner

*Primary Examiner* — Tan Q Nguyen
(74) *Attorney, Agent, or Firm* — Patrick J. Daugherty; Driggs, Hogg, Daugherty & Del Zoppo Co., LPA

(57) ABSTRACT

Methods, including service methods, program products and systems are provided for sensing vehicle loads and responsively and automatically configuring a vehicle. Vehicle-mounted load sensors sense vehicle loads, a vehicle processing means calculating a load imparted to the vehicle and comparing imparted loads to load capacity ratings or thresholds and responsively adjusting a vehicle cooling, transmission, braking, suspension or engine system into a revised operating mode. Modifying a component may entail revising a load capacity rating or threshold and repeating sensing, calculating, comparing and adjusting until the revised rating or threshold is met, or progressively adjusting in proportion to a change in a historic sensed load. Adjusting of the vehicle system may be biased to a performance characteristic or a load distribution. A supervisory entity may override automatic adjustment.

22 Claims, 4 Drawing Sheets

ADAPTIVE VEHICLE CONFIGURATION

FIELD OF THE INVENTION

The present invention generally relates to the configuration of vehicle systems, more particularly, to methods, systems, and program products for configuring vehicle systems in response to operating load parameters. It is also amenable to other applications in which it is desirable to provide transmission system configurations responsive to working load observations.

BACKGROUND OF THE INVENTION

Vehicles, including passenger automobiles, are engineered to perform under certain anticipated operating conditions and constraints, and in particular within maximum loading capacities defined relative to carrying weight and towing weight parameters. Generally vehicle manufacturers determine and provide individual vehicle rating specifications to owners and operators that indicate how much weight a vehicle can safely support and tow. The total recommended amount of weight that can be safely supported by a vehicle is known as the vehicle's gross vehicle weight rating (GVWR), which includes the weight of the vehicle itself (also known as the "curb weight"), fuel and other fluids, passengers, and all cargo. The Maximum Gross Trailer Weight (MGTW) is the recommended maximum weight that a particular vehicle can safely haul when attached to a vehicle trailer hitch. It is intended that owner/operators apply these ratings in loading and operating their vehicles.

However, a given vehicle may be offered with a plurality of option choices, so similar base-model vehicles may have divergent curb weights dependent upon the specific options chosen (or omitted) at or after manufacture, and intervening parties may install additional after-market options that increase the curb weight and proportionately reduce the actual load carrying capacity of the vehicle. Accordingly, actual vehicle curb weights are not generally provided to end user owner/operators by manufacturers or dealers but must be determined on a vehicle-by-vehicle basis by each owner or operator. Moreover, cargo and passenger weights may be unknown, and cargo and passenger loading may vary widely from trip to trip or during portions of a trip as passengers enter and leave a vehicle, or cargo portions are removed or added. If the vehicle is also used in towing applications, hitching a trailer or other towed article to a rear bumper hitch also adds a tongue weight load to vehicle through the hitch, for which cargo and passenger weight carrying capacity must be reduced accordingly; and moreover, the tongue weight actually applied may be unknown or undeterminable. Thus even if a vehicle operator has determined an actual load capacity, he may not be able to accurately or consistently apply the determined capacity in passenger and cargo loading.

SUMMARY OF THE INVENTION

Methods, program products and systems are provided for sensing vehicle loads and responsively and automatically configuring a vehicle. Methods provide a vehicle-mounted load sensor sensing a vehicle load and providing a load output. Vehicle processing means are also provided for calculating a load imparted to the vehicle from the load sensor output, comparing imparted loads to at least one of a vehicle load capacity rating and a threshold, and adjusting a vehicle system into a revised operating mode in response to compared imparted loads meeting or exceeding a vehicle load capacity rating or a threshold, the vehicle system a vehicle cooling system, a vehicle transmission system, a vehicle braking system, a vehicle suspension system or a vehicle engine system.

Some methods comprise modifying a vehicle component or load trailer component; revising at least one of the vehicle load capacity rating and the threshold; and repeating sensing the vehicle load, calculating the load imparted, comparing the imparted load and adjusting the vehicle system. Still other methods comprise adjusting the vehicle system by modifying a vehicle component or load trailer component, and repeating revising of a vehicle load capacity rating or threshold, sensing the vehicle load, calculating the load imparted, comparing the imparted load and adjusting the vehicle system until a revised vehicle load capacity rating or threshold is met. And in some methods adjusting the vehicle system comprises progressively adjusting the vehicle system in proportion to an increase or decrease of a sensed load relative to a historic sensed load.

Still other methods comprising biasing the adjusting of the vehicle system to optimize a performance characteristic. In some methods the performance characteristic is selected from the group comprising vehicle system fuel efficiency, vehicle system power output, and vehicle transmission control and vehicle engine emission reduction. In one method biasing comprises optimizing a fuel efficiency of the vehicle system in response to loads sensed below an efficient load threshold or optimizing a vehicle system power output in response to loads sensed above a power load threshold. In another method biasing comprises progressively optimizing a vehicle system power output at the expense of vehicle system fuel efficiency in proportion to determined increases in sensed loads. And one method comprises adjusting the vehicle system in response to an operating environment input.

Some methods comprise deploying a first load sensor in a first vehicle area and a second load sensor in a second vehicle area, determining a vehicle load distribution by comparing the first and second load sensor inputs, and adjusting the vehicle system is responsive to the determined vehicle load distribution. And one method comprises notifying a supervisory entity of automatically adjusting a vehicle system into a revised operating mode, the supervisory entity overriding the adjusting of the vehicle system.

In another aspect, a method is provided for producing computer executable program code, storing the produced program code on a computer readable medium, and providing the program code to be deployed to and executed on a computer system, for example by a service provider who offers to implement, deploy, and/or perform functions for others. Still further, an article of manufacture comprising a computer usable medium having the computer readable program embodied in said medium may be provided. The program code comprises instructions which, when executed on the computer system, cause the computer system to sense vehicle loads and responsively and automatically configure a vehicle, and more particularly to calculate a load imparted to a vehicle from a vehicle-mounted load sensor output; compare the imparted load to at least one of a vehicle load capacity rating and a threshold; adjust a vehicle system into a revised operating mode in response to the compared imparted load meeting or exceeding the vehicle load capacity rating or the threshold, the vehicle system selected from the group comprising a vehicle cooling system, a vehicle transmission system, a vehicle braking system, a vehicle suspension system and a vehicle engine system; revise at least one of the vehicle load capacity rating and the threshold in response to a modification of a vehicle component or a load trailer component; and repeat sensing the vehicle load, calculating the load imparted, comparing the imparted load and adjusting the vehicle system into a revised operating mode.

Systems for sensing vehicle loads and responsively and automatically configuring a vehicle are also provided, comprising a vehicle-mounted load sensor configured to sense a vehicle load and provide a load output; a vehicle processing means in communication with the load sensor configured to calculate a load imparted to the vehicle from the load sensor output, compare the imparted load to at least one of a vehicle load capacity rating and a threshold and adjust a vehicle system into a revised operating mode in response to the compared imparted load meeting or exceeding at least one of the vehicle load capacity rating and the threshold, and wherein the vehicle system is selected from the group comprising a vehicle cooling system, a vehicle transmission system, a vehicle braking system, a vehicle suspension system and a vehicle engine system.

In some systems, the processing means comprises a gross vehicle weight logic component configured to compare sensor load measurements to a gross weight rating threshold; a trailer tongue weight logic component configured to compare a sensed hitch tongue weight load to a tongue weight threshold; and a trailer axle weight logic component configured to compare a sensed trailer cargo load to a trailer cargo weight threshold; wherein the processing means comprises is configured to evaluate gross vehicle weight logic component, trailer tongue weight logic component and trailer axle weight logic component outputs for compliance with a vehicle and trailer combination weight rating threshold and responsively adjusting the vehicle system into the revised operating mode.

In some systems, a processing means is further configured to adjust the vehicle system progressively in proportion to an increase or decrease of the sensed load relative to a historic sensed load. In one system, the processing means is further configured to bias adjusting of the vehicle system to optimize a performance characteristic. In another system the performance characteristic is selected from the group comprising vehicle system fuel efficiency, a vehicle system power output, a vehicle transmission control and an engine emission reduction. In still another system, the processing means is configured to optimize the vehicle system fuel efficiency in response to a load sensed below an efficient load threshold or optimize the vehicle system power output in response to a load sensed above a power load threshold, and one system processing means is configured to progressively optimize the vehicle system power output at the expense of the vehicle system fuel efficiency in response to a proportionate increase in a sensed load.

In one system, the processing means is configured to adjust the vehicle system in response to an operating environment input. Another system comprises a first load sensor in a first vehicle area and a second load sensor in a second vehicle area, a processing means configured to determine a vehicle load distribution by comparing the first and the second vehicle area load sensor inputs and adjust the vehicle system responsive to the determined vehicle load distribution. And in another system, the processing means is further configured to notify a vehicle operating entity of adjusting the vehicle system, and to override said adjusting in response to an override input.

Service methods are also provided, including deploying an application for sensing vehicle loads and responsively and automatically configuring a vehicle. Computer infrastructures are provided operable to calculate a load imparted to a vehicle from a vehicle-mounted load sensor output, compare the imparted load to a vehicle load capacity rating or a threshold and adjust a vehicle system into a revised operating mode in response to the compared imparted load meeting or exceeding the vehicle load capacity rating or the threshold. The adjusted vehicle systems include a vehicle cooling system, a vehicle transmission system, a vehicle braking system, a vehicle suspension system and a vehicle engine system. Further, vehicle load capacity rating or threshold are revised in response to a modification of a vehicle component or a load trailer component, the service repeating the sensing the vehicle load, the calculating the load imparted, the comparing the imparted load and the adjusting the vehicle system into a revised operating mode described above.

BRIEF DESCRIPTION OF THE DRAWINGS

These and other features of this invention will be more readily understood from the following detailed description of the various aspects of the invention taken in conjunction with the accompanying drawings in which.

Figure 1:
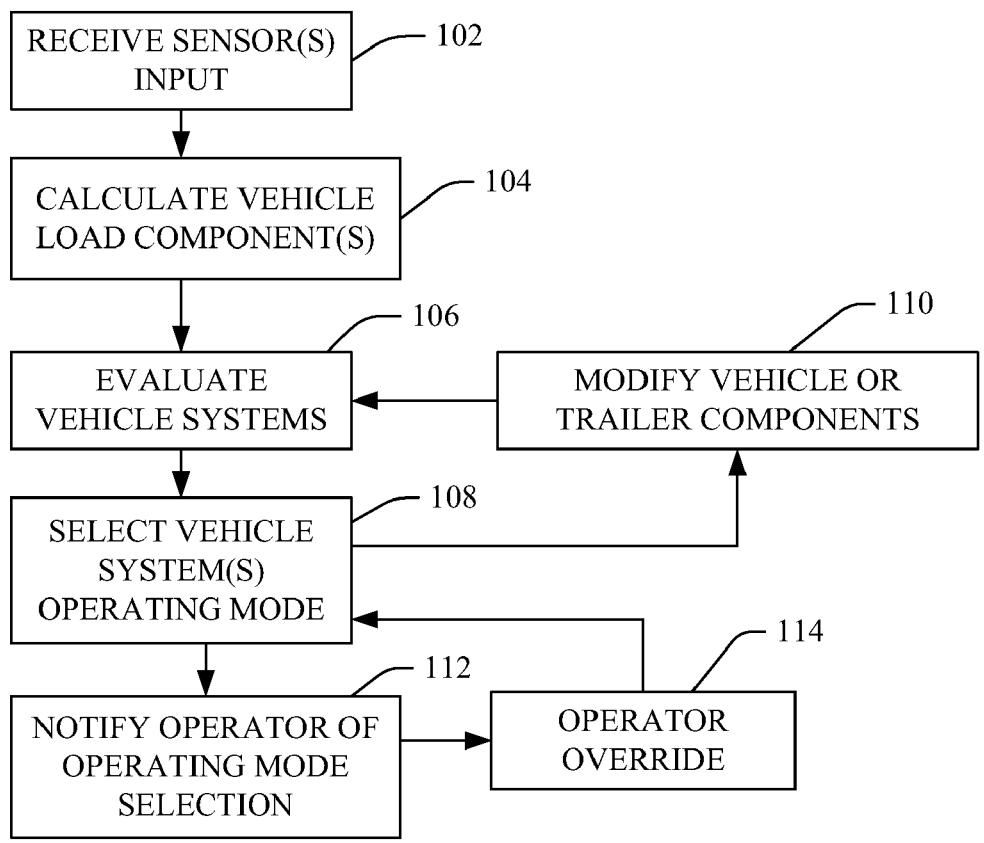
FIG. 1 is a flow chart illustrating a method or process for sensing vehicle loads and responsively configuring a vehicle.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description; and
II. Computerized Implementation.

I. GENERAL DESCRIPTION

Vehicle owners and operators should avoid exceeding vehicle Maximum Gross Trailer Weight (MGTW) ratings provided by manufacturers. However, vehicle modifications, malfunctioning or non-serviceable components or other performance issues may reduce the actual MGTW for a given vehicle, without notice to an operator. The actual towing load of a given towing application may be unknown or even undeterminable to a vehicle operator. And vehicle performance may also be compromised by operating environments and conditions, such as poor driving surfaces caused by inclement weather (for example snow, ice, rain, slush) or hill climbing and other high-grade percentage travel requirements. Thus an operator may actually and unknowingly exceed safe towing loads even if attempts are made to comply with MGTW ratings.

Some prior art vehicles provide for manually selectable alternative towing-mode transmission and/or braking system configurations that optimize vehicle safety and/or performance characteristics for towing tasks. However, the correct and efficient operation of such manual systems rely upon the ability of an operator to accurately and consistently choose an appropriate mode for a particular task, or to revise an original selection if conditions change. In one respect, choosing a towing mode when unnecessary (for example, when not towing or in light towing load applications) generally results in a degradation of vehicle performance, needlessly reducing fuel consumption, acceleration, and/or braking efficiencies. And failure to correctly select a towing mode for an appropriate towing weight load, or as otherwise indicated by slippery road conditions, may compromise vehicle safety. Moreover, as such systems only provide two modes, towing or non-towing, they are limited in providing efficient towing or braking strategies for any one given load or change in load characteristics. For example, a light towing load may be too light to justify the inefficiency of a towing mode selection, yet may still impact vehicle performance negatively in non-towing mode.

Prior art systems have been proposed to assist owner/operators in monitoring actual vehicle loading for compliance with maximum cargo and towing load capacities. However, these systems still rely upon an owner or operator to correctly determine basis (un-loaded) vehicle weight parameters, which introduces difficulties and uncertainties as discussed above. Moreover, even if excessive load conditions are correctly indicated to an owner/operator, such systems only propose warning operators of detected problems and/or suggesting corrective actions: safe vehicle operation is still dependent upon the actions of an operator properly understating a warning and/or proposed solution and taking an appropriate corrective actions, no affirmative steps are taken directly by such systems to ensure efficient and safe operation of the vehicle. Such systems also fail to provide updated determinations and warnings when load parameters change during a task, such as if steep grades or slippery roads are unexpectedly encountered.

The present invention provides systems, methods, and program products enabled to sense vehicle load parameters and responsively and directly select an appropriate vehicle system configuration, providing an improved technique for optimizing vehicle performance characteristics for vehicle cargo and towing loads. FIG. 1 illustrates a method or process for vehicle load sensing and configuration according to the present invention. Exemplary vehicles appropriate for use with the present invention include passenger cars, utility and pick-up vehicles, trucks, all-terrain vehicles (ATV's), motorcycles, boats, and luggage and golf carts; other vehicles appropriate for use with the present invention will also be apparent, and the present examples are merely illustrative and not exhaustive. The present invention may also be incorporated into non-vehicle load-bearing applications, for example in manufacturing machinery that includes motor, transmission, speed reducer or element braking systems.

At 102 vehicle load parameter inputs are received from one or more sensors and at 104 loads imparted to the vehicle are calculated from the sensor inputs (e.g. by a calculator component). At 106 present vehicle system configurations are evaluated with respect to the calculated load components, and if indicated one or more system configurations are altered and/or selected responsively at 108. In one aspect one or more vehicle components or load trailer components may be modified at 110, in some examples in response to configuration alterations or selections at 108, and subsequent to said modification vehicle system configurations are again evaluated at 106, and if necessary or indicated then one or more system configurations may be responsively altered and/or selected at 108.

At 112 a vehicle operator is notified of a system configuration alteration or selection made at 108, and at 114 a vehicle operator may be given an opportunity to override a selection made and force an alternative selection or configuration alteration through entering an appropriate input at 108. In some examples a selection made at 108 may be conditional upon a confirmation entry or additional data entered at 114, for example in response to a query or prompt at 112.

Figure 2:
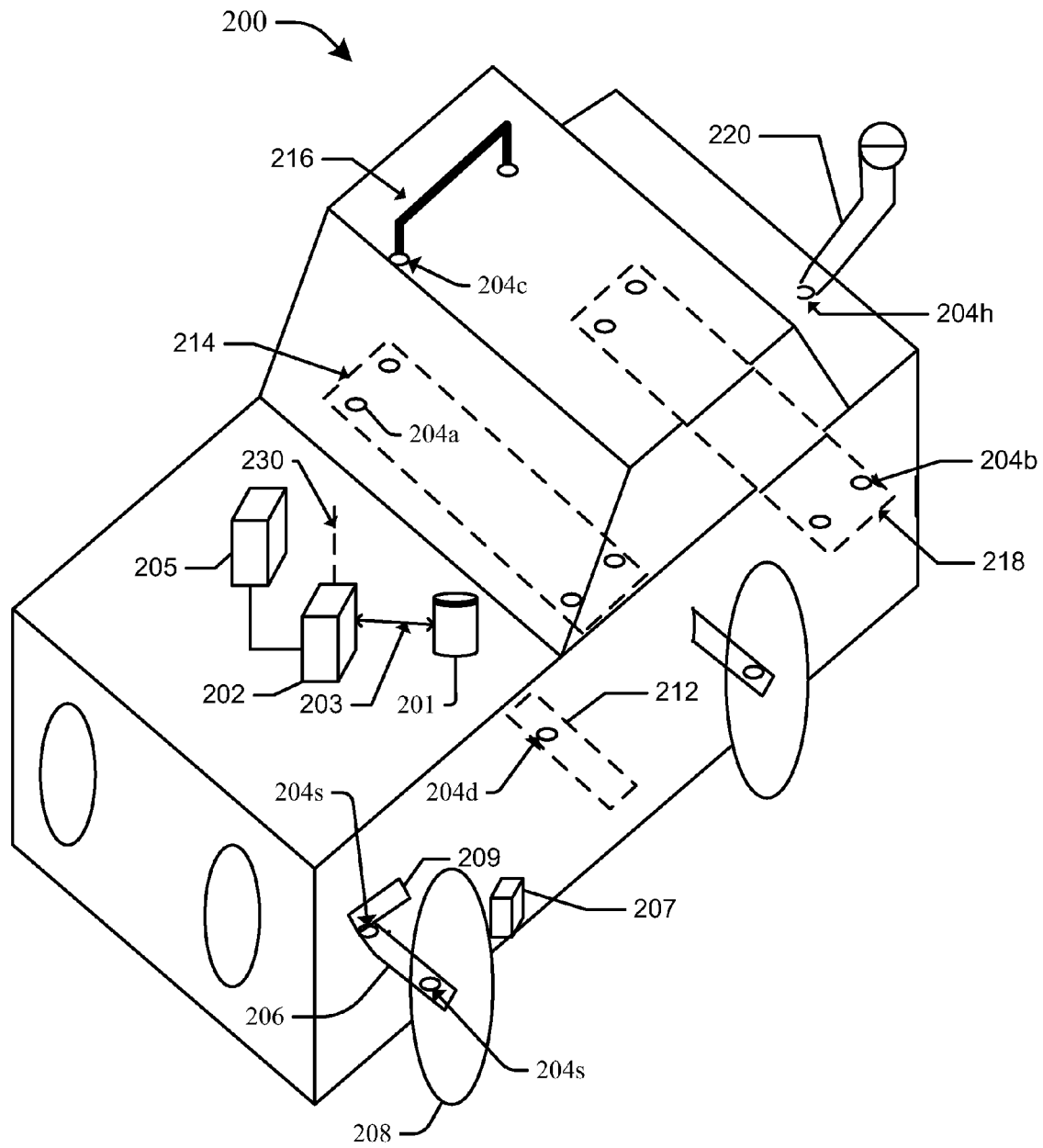
FIG. 2 is a perspective view diagram of a vehicle incorporating a system for sensing vehicle loads and responsively configuring a vehicle.

FIG. 2 illustrates a vehicle 200 incorporating components configured to perform the methods and/or processes of FIG. 1, thus configured to sense vehicle load parameters and responsively and directly select an appropriate vehicle system configuration. At least one load sensor 204 is configured to sense a cargo load and provide load inputs to a processing means 202 configured to receive sensor 204 outputs and make loading determinations from the received sensor 204. An operating condition sensor 207 may also be provided: in one example a sensor 207 provides temperature observations and road surface observations (including wetness, snow or ice condition indications) to the processing means 202.

The gross vehicle weight (GVW) of the vehicle 200 may be defined as the total weight of the vehicle, including driver, passengers, equipment, options, accessories, cargo, and operative fluid loads (fuel, coolant, etc.), and is determined by the processing means 202 by adding loads detected by the at least one sensors 204 to a predetermined base "curb weight" value saved in the storage device 201, the curb weight being the empty weight of the vehicle typically determined and provided by a vehicle manufacturer. Thus, in some embodiments, GVW determinations may be made for the vehicle 200 by adding a specified curb weight to outputs from suspension load sensors 204s disposed within each of the wheels 208 between the wheel and an axle arm 206, and/or between the axle 206 and a vehicle or engine frame component 209.

Trailer hitches on a vehicle are generally rated for a specific maximum weight, and thus providing for automatic tongue weight monitoring and responsive vehicle system modifications provides safety and performance advantages over prior art systems that rely on owner/operators to determine tongue weight loads and take appropriate actions in response thereto. In one example, a tongue weight load may be calculated indirectly by comparing aggregate GVW's determined through suspension sensor 204s inputs before and after attaching a trailer or other hitch tongue weight load to the vehicle hitch, the difference thereby providing the hitch tongue weight load.

Figure 3:
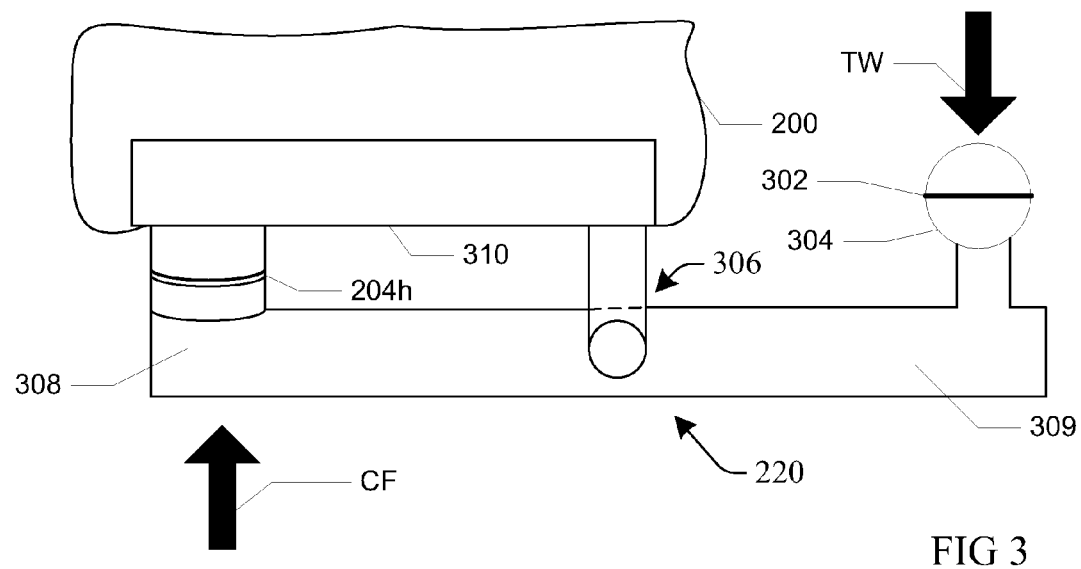
FIG. 3 is a side view of hitch incorporating components of a system for sensing vehicle loads and responsively configuring a vehicle.

The trailer-loaded and un-trailered GVW determinations may be made in response to owner/operator manual inputs, for example through use of a manual switch toggled before and after trailer attachment, or they may be performed automatically by the processing means 202. For example, FIG. 3 provides a side view of an embodiment of the vehicle 200 hitch 220. The processing means 202 may constantly monitor weight sensors 204 inputs and compute revised current GVW values in response to changing sensor 204 inputs, and wherein a signal from a hitch ball switch 302 indicating engagement of the hitch ball 304 by a trailer component causes the processing means 202 to make a subsequent trailer-load GVW determination, the difference from the subsequent trailer-load GVW from a previous GVW determination representing a tongue weight load determination.

Figure 4:
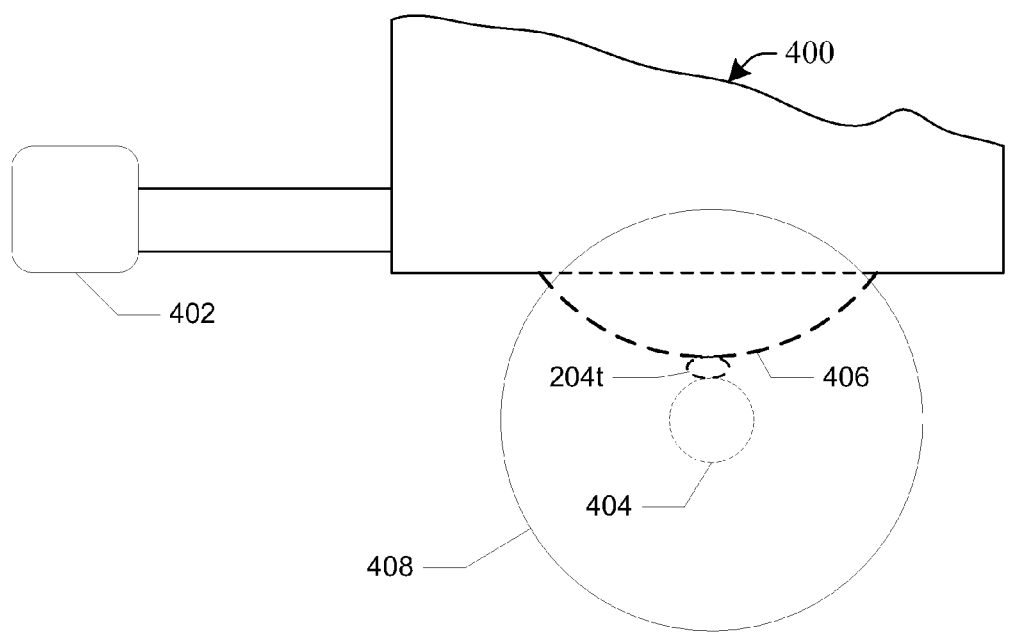
FIG. 4 is a side view of trailer incorporating components of a system for sensing vehicle loads and responsively configuring a vehicle.

Towing vehicles must also generally observe a maximum Gross Trailer Weight Rating (GTWR); this rating is provided by a manufacturer and specifies the maximum trailer weight (including all cargo) that may be safely towed. In prior art systems, verifying that a towed article does not exceed the GTWR requires actually weighing the article, for example by putting a fully loaded trailer on a scale. FIG. 4 illustrates one embodiment of the present inventions wherein a trailer 400 configured to attach to the vehicle 200 hitch 220 through a hitch attachment means 402 comprises a trailer sensor 204*t* is interposed between a lower trailer axle 404 and an upper trailer component 406 (for example, an axle differential case 406), the axle connected to a wheel 408. The trailer sensor 204*t* measures the forces applied upward from the axle 404 relative to the differential case 406 and thus onto the sensor 204*t* directly in response to downward forces exerted by the weight of cargo loaded onto the empty trailer 400. Therefore, a total gross trailer weight GTW may be determined by adding a specified or determined empty trailer curb weight to the trailer sensor 204*t* force observations. In the present example, the trailer sensor communicates directly with the vehicle processing means 202, which makes this determination; however, in some embodiments the trailer 400 may have its own processing means (not shown) configured to make and provide GTW determinations to the vehicle processing means 202.

The communication path(s) 230 between the processing means 202 and the sensors 204 may be wireless and/or wired. Examples of wireless configurations include Bluetooth™, wireless fidelity (WiFi), WiMAX™, Near Field Communications (NFC), Zigbee™, RuBee®, 802.11 wireless local area network (WLAN), short message service (SMS) and/or radio frequency identification (RFID) reader components and systems, and other alternative components, technology, proprietary protocols and physical connections appropriate to practice the present invention(s) will be apparent to one skilled in the art. (BLUETOOTH is a trademark of Bluetooth SIG in the United States and/or other countries; ZIGBEE is a trademark of the Zigbee Alliance in the United States and/or other countries; WIMAX is a trademark of the Wimax Forum in the United States and/or other countries; and RUBEE is a trademark of Visible Assets, Inc. in the United States and/or other countries.)

As illustrated, the processing means 202 is located within and near the front of the vehicle 200, however it may be located elsewhere in the vehicle 200 or external thereto, such as for example at an operator's residence or business location, a dealership, a repair shop, and the like. When installed in the vehicle 200, the processing means 202 may be powered by the car battery, a battery local to the processing means 202, and/or other source of power, for example, a solar cell, etc. When installed outside of the vehicle 200, the processing means 202 may be powered by power mains, a battery, and/or other source of power.

A storage component 201 may be provided to store information such as the historic sensor 204 outputs, vehicle 200 and trailer 400 curb weights and/or other information, and may include memory or other storage mediums for storing information. Illustrative but not exhaustive examples of other information stored in the storage component 201 include cargo hauling or towing events, including date, time of day, time duration of an event, loading observations including individual and aggregate sensed loads, unique identifiers of a towing event for associating an event with a particular load, and/or other information related to towing or carrying a load.

The storage component 201 may be affixed to the vehicle 200, such as near the front as depicted or elsewhere. The storage component 201 may be part of a portable device that can be variously placed in the vehicle 200. Alternatively, the storage component 201 may be located external to the vehicle 200, such as at an operator's residence or business location, a dealership, a repair shop, and the like. The communication path 203 between the processing means 202 and the storage component 201 may be wireless and/or wired. In addition, the storage component 201 can communicate with various other devices such as a computer, a personal data assistant, a cell phone, a cell tower, a network, a printer, another storage component, and the like.

Figure 5:
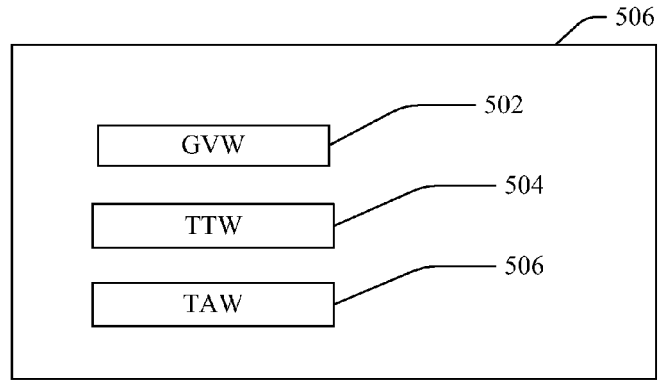
FIG. 5 is block diagram view of a vehicle system evaluator component of a system for sensing vehicle loads and responsively configuring a vehicle.

FIG. 5 illustrates an example of a weight calculation logic component 506 configured to enable the processing means 202 (FIG. 2) to evaluate vehicle systems according to the present invention (e.g. to perform the processes described at 106, FIG. 1). The weight calculation component 506 comprises three logic subsystems: a Gross Vehicle Weight (GVW) component 502, a Trailer Tongue Weight (TTW) component 504 and a Trailer Axle Weight (TAW) component 506. The GVW component 502 enables the processing means 202 to add vehicle load measurements from the sensors 204 to a vehicle's specified base curb weight to determine a GVW for the vehicle 200, and also to compare the determined GVW to the GVWR or one or more other GVW threshold values appropriate to the vehicle 200, for example as discussed above, and/or to calculate a Reserve Tow Vehicle Cargo Capacity (RTVCC) of the vehicle 200. (RTVCC may be understood as the difference between the GVWR and the curb weight.) The GVW component 502 enables the processing means 202 to monitor remaining RTVCC as increasing cargo loads proportionately reduce initial RTVCC values, in some examples enabling the processing means 202 to provide real-time RTVCC information to an owner/operator through a vehicle instrument panel or other display or notifying device.

The TTW 504 and TAW 506 components have application for towing load applications. The TTW component 504 enables the processing means 202 to determine tongue weight loads from trailer tongue weight sensor 204*h* inputs and compare them to one or more TTW threshold values, for example against a maximum tongue weight specification provided for the vehicle 200 by a manufacturer. The TAW component 506 enables the processing means 202 to monitor loads transmitted from gross trailer weight sensor(s) 204*t* and to determine cargo loads at the trailer axle 404 and add these values to a specified base trailer 400 curb weight and compare the sum to one or more preset TAW thresholds, for example including a specified Gross Trailer Weight Rating (GTWR). The GTWR may be understood as the maximum allowable weight of the trailer 400 plus its cargo as determined for the vehicle 200 by a manufacturer. In some examples, the processing means 202 is thereby enabled to provide real-time GTWR information to an owner operator through a vehicle instrument panel or other display or notifying device.

The processing means 202 is also configured to process GVW 502, TTW 504 and TAW 506 component outputs in combination. In one example the processing means 202 monitors a vehicle 200/trailer 400 combination for compliance with a Gross Combination Weight Rating (GCWR). The GCWR is commonly defined by a vehicle manufacturer as a maximum total combined weight of a loaded vehicle 200 and a loaded trailer 400, and exceeding the GCWR is generally considered unsafe. More particularly, it is possible for the vehicle 200 to have a gross vehicle weight determined by the processing means 202 through use of the GVW component 502 to be below a maximum GVWR value, and trailer tongue weights and trailer axle weights determined by the processing means 202 through use of the TTW 504 and TAW 506 components respectively to also be within safe thresholds, yet wherein a combination of said values may exceed the GCWR.

Thus, the processing means 202 is further configured to determine whether GVW 502, TTW 504 and TAW 506 logic component output combinations comply with one or more thresholds.

Weight sensors 204 may also be deployed in other vehicle areas, enabling additional precision in determining specific vehicle loads otherwise aggregated by the suspension sensors 204s, for example distinguishing between passenger loading, trunk or roof storage area loading, and hitch tongue weight loading. Accordingly, referring again to FIG. 2, sensors 204 may include passenger seat load sensors 204a distributed between lower seat supports (not shown) and a supportive floor area 214. The present example provides for four end-distributed seat load sensors 204a configured to sense loads from each end of front and back bench seating (not shown), but it will be appreciated that other seat sensor 204a configuration and distributions may be practiced.

The sensors 204 may also include trunk cargo load sensors 204b, for example distributed at the edges or corners of a trunk mat 218 deployed across a trunk cargo area, the mat 218 rigid enough to evenly distribute cargo loads placed thereupon. Roof rack sensors 204c may be distributed underneath the corners of a roof rack 216. Flooring sensors 204d may be distributed beneath the floor mats 212, wherein floor mat 212 material or another flooring component under the floor mat 212 or interior floor covering is rigid enough to evenly distribute weight placed thereupon. Other floor sensor 204d configuration and distributions may be practiced, for example including sensor 204d distributions under a vehicle frame component directly supporting all cargo, seat, interior flooring and storage area loads. One or more hitch sensors 204h may be deployed to determine tongue weight loads on a vehicle hitch 220, for example as applied by an attached trailer 400.

Thus, in one aspect, different discrete sensor 204 locations enable distinguishing between specific vehicle area loading characteristics and select system configurations appropriate to a sensed load distribution. In one example, comparison of lower area seat sensor 204a, trunk sensor 204b and/or flooring sensor 204d inputs to upper area roof-top cargo load sensor 204c inputs may enable the processing means 202 to detect and/or determine a top-heavy load distribution requiring an appropriate suspension system selection or modification in order to diminish an increased risk of vehicle roll-over.

Tongue weight loads may also be directly determined through use of hitch load sensors 204h. In the embodiment illustrated in FIG. 3 an exterior hitch 220 end 309 comprising a hitch ball 304 extends rearward relative to a pivot-point attachment means 306 connecting the hitch 220 to the vehicle 200. The sensor 204h is disposed between an interior hitch end 308 and a rear vehicle pressure plate component 310. The rear hitch 220 thereby acts as a lever, the pivot-point 306 translating downward tongue weight forces TW acting on the exterior hitch end 309 upward into compressive forces CF exerted by the interior hitch arm 308 and urging the interposed sensor 204h against the pressure plate 310. Thus downward tongue weight forces TW may be monitored and determined in real-time from sensor 204h outputs, the tongue weight load thus determined independent of GVW determinations.

According to the present invention, vehicle load determinations may also be responsive to operating condition inputs. In one example, temperature observations from a temperature sensor 207 may be used to configure one or more vehicle systems, for example revising transmission shifting and/or braking strategy selections in response to below-freezing temperature inputs in order to optimize ice or snow-covered road surface performance, or increasing cooling system performance for sensed high temperatures, and in some examples each further dependent upon sensed load observations. In another example, a moisture sensor 207 may provide wet road or tire surface condition inputs used to responsively select transmission or braking strategies. Engine systems and components may also be selected or configured in response to sensed loads and/or operating condition parameter inputs. For example, thresholds may be set or revised for changing from normal to turbo modes; selecting a quantity of operating engine cylinders (in some embodiments only using four of a possible eight cylinders when appropriate); selecting more aggressive engine cylinder operation strategies for smaller engines, such as four cylinder engines; and responsively altering fuel and/or oil mixtures during engine operations. Still other engine system modes selections or modifications may also be apparent to one skilled in the art.

Referring again to FIG. 2, the processing means 202 communicates with a vehicle onboard diagnostic system or other type of computer processing unit 205 configured to control one or more vehicle 200 systems, wherein the processing means 202 may thus directly choose a vehicle system mode in response to vehicle system evaluations (e.g. at 106, FIG. 1). In some examples, the computer processing unit 205 is a second-generation on-board diagnostic interface (OBD-II) computer 205 configured to provide a gateway through an OBD-II interface 230 that enables the retrieval of vehicle diagnostic and error information, for example by vehicle service technicians and other service provider and monitoring entities connecting to the OBD-II interface 230. And it will be understood that in some embodiments the vehicle computer 205 may function directly as the processing means 202 in performing processes according to the present invention. This may be distinguished from the prior art, wherein responsibility for taking appropriate action in operating a vehicle or trailer in response to cargo or towing load determinations lies entirely upon an owner/operator, and wherein misapplied loading manual determinations may result in inefficient or unsafe operating modes selections. In contrast, the present invention provides for directly and automatically optimizing vehicle system strategies in response to load sensor inputs, including electing strategies optimized for sensed towing and cargo loads and/or operating conditions, which may include locking-out or disabling a vehicle 200 until it is determined that loads have been reduced below unsafe cargo or towing load thresholds.

Moreover, under the limitations of prior art systems, vehicle manufacturers have typically offered only two owner-selectable operating modes, a tow mode and a non-tow mode, wherein operators are relied upon to accurately determine vehicle and trailer loading and select the appropriate mode. However, accurate loading determinations are cumbersome and difficult to acquire, and choosing the wrong mode for a given load results in either performance degradation or unsafe operation under the prior art. For example, a vehicle tow-mode selection should only be made when towing at least 75% of the rated capacity, otherwise vehicle transmission shifting becomes rough and inefficient for lower loads, cooling strategies may become unnecessarily robust, and braking strategies may be excessively increased, each of which needlessly reduces fuel efficiency. And if an operator chooses instead to leave a vehicle in non-tow mode in order to maximize performance or fuel efficiency, he may compromise cooling and braking system performance and vehicle safety for loads that exceed the 75% of capacity rating.

Furthermore, operating conditions may dictate the need for changing a mode selection during a task: a load below 75% of rated capacity may have be conveyed up a steep grade for a portion of a trip, the steep grade adding loading vector components that causing the load to effectively exceed the 75% threshold, or road conditions may become icy and wet, requiring an operator to recognize the need for more robust braking, cooling and transmission strategies and toggle between tow and non-tow mode strategies at appropriate trip points. Moreover, providing only two selectable modes inherently introduces other inefficiencies: one or more intermediate modes may be preferred for some intermediate loads wherein a tow-mode is inefficient yet a non-tow mode is not ideal.

In contrast, by directly interfacing with the onboard computer system 205, the processing means 202 of the present invention may continuously adjust vehicle 200 systems in response to real-time load sensor 204 inputs and feedback, enabling dynamic real-time selection from a continuum of possible vehicle operating modes in response to evaluating vehicle systems (e.g. at 106, FIG. 1). In one example, shifting patterns may be progressively altered in proportion to sensed load or operating condition inputs, for example increasing engine RPM shifting thresholds in response to sensed load increases (such as in response to climbing a positive grade) or temperatures dropping below freezing, or lowering RPM shifting thresholds as loads diminish (when the same vehicle and load traverse level or negative grade roads) or road or tire surfaces dry. In another aspect, load sensors 204 outputs may be evaluated in the context of vehicle speed changes, and thus increased inertial load inputs from the sensors 204 in response to speed changes may indicate transmission, braking, motor and/or cooling strategies should be biased toward higher towing or cargo load selections.

Dynamic vehicle system configuration by the processing unit 202 may also be biased to optimize one or more performance characteristics. For example, the processing means 202 may select (e.g. at 108, FIG. 1) vehicle shifting and cooling strategies appropriate for a sensed load and also optimized for power at the expense of gasoline efficiency, or instead also optimized for efficient gasoline mileage at the expense of performance or control. In some embodiments, performance biasing may vary in response to evaluating vehicle systems (e.g. at 106, FIG. 1); for example, the processing means 202 may bias unloaded mode shifting and cooling strategies toward optimizing gasoline mileage for lower sensed loads, and then progressively bias toward optimizing vehicle performance or control at the expense of fuel economy in selecting towing mode strategies in response to sensed load increases.

The processing means 202 may also be programmable to change strategy biasing and selection characteristics in response to parameter inputs. For example, governmental regulations (such as U.S. E.P.A. fleet fuel economy standards) may require that a given vehicle demonstrate a specific fuel efficiency for a specific operating load condition, and a first fuel efficiency parameter value may thus be chosen and used in selecting appropriate system strategies. If, however, a fuel efficiency standard changes, for example through a regulation revision, then a second fuel efficiency parameter value may be chosen and used instead in selecting strategies, thus directly and automatically placing the vehicle 200 in compliance with the new standard.

In another aspect, notifying an operator (e.g. at 112 of FIG. 1) may comprise informing an operator or other party of a system configuration selected (e.g. at 108 of FIG. 1). An operator may then take steps to change the vehicle loads, such as reducing a cargo or towing load until the processing means 202 selects a more efficient power strategy or smoother shifting strategy and notifies the operator of the change. In another example, an operator or remote supervisor is notified that an unsafe vehicle load has been sensed and that vehicle operations are locked out, and if said loads are brought below unsafe levels then a subsequent safe operating condition notice is provided and the locked-out operations are enabled by the processing means 202.

In another aspect, an operator or supervisor may be given an override option. In one example a remoter supervisor notified of an unsafe load may contact the operator and upon verification that appropriate abatement actions have been taken, enter an override input to enable the locked-out system. An operator or supervisor may also elect to override a first vehicle system strategy selected by the processing means 202 and select a second strategy, for example choosing to sacrifice climbing power for increased gas mileage performance.

Referring again to FIG. 1, modification of vehicle or trailer components at 110 may result in reconfiguration of processing means 202 calculator and evaluator logic components. As replacement of vehicle 200 suspension components with higher-rated components may increase gross vehicle weight, gross trailer weight or reserve tow vehicle cargo capacity ratings, at 110 component parameter inputs to calculator or evaluator logic components may reconfigure the GVW 502, TTW 504 and TAW 506 logic components to recognize the new ratings. Thus, replacement suspension parts or transmission components may be rated for specific load performances and assigned corresponding component parameters which are entered into appropriate logic components of the processing means 202 at the time of installation by a technician, thereby changing vehicle system selection thresholds and their application (e.g. at 108, FIG. 1).

Configuring systems and methods according to the present invention for modification in response to vehicle system alterations also enable feedback strategies. Thus, a responsive vehicle system adjustment (e.g. at 108, FIG. 1) may include a system component alteration or selection at 110, and wherein vehicle system performance subsequent to the alteration or selection is again evaluated at 106, and wherein the steps 108-110-106 may loop through multiple iterations until an appropriate condition or threshold comparison value is observed at 108. Thus, in some embodiments, the component alteration or selection step 110 may be preformed in a progressive series of adjustment iterations through repeating the steps 108-110-106.

II. COMPUTERIZED IMPLEMENTATION

Figure 6:
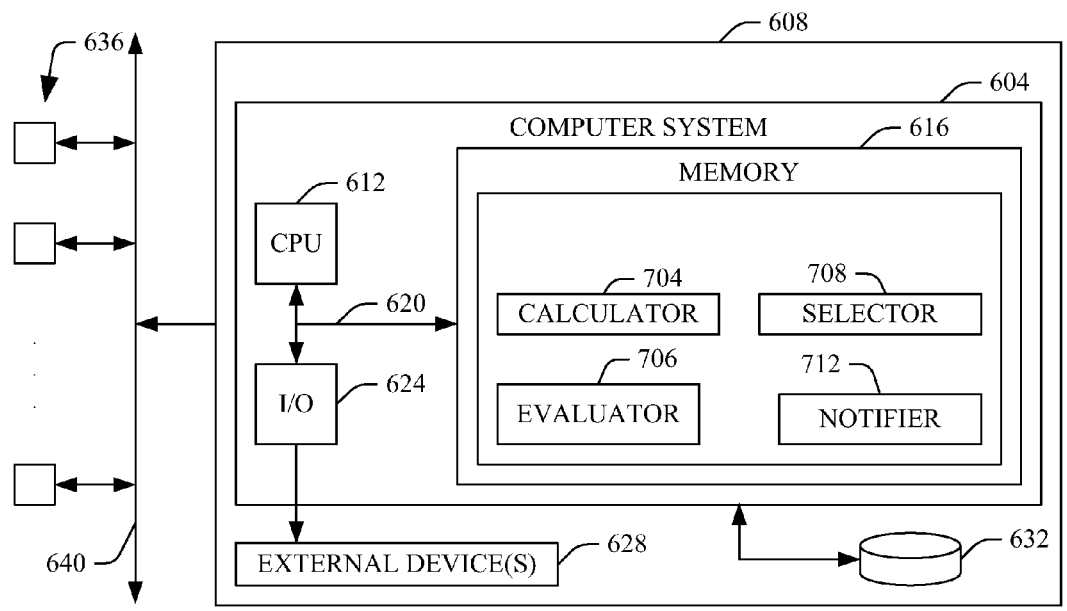
FIG. 6 is a block diagram illustrating an exemplary computerized implementation of a system and method for sensing vehicle loads and responsively configuring a vehicle.

Referring now to FIG. 6, an exemplary computerized implementation includes a computer system 604 deployed within a computer infrastructure 608 such as one existing with the car 200 described above. This is intended to demonstrate, among other things, that the present invention could be implemented within a network environment (e.g., the Internet, a wide area network (WAN), a local area network (LAN), a virtual private network (VPN), etc.), in communication with one or more additional computers 636, or on a stand-alone computer infrastructure 608. In the case of the former, communication throughout a network 640 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 608 is intended to demonstrate that some or all of the components of implementation could be deployed, managed, serviced, etc. by a service provider who offers to implement, deploy, and/or perform the functions of the present invention for others.

As shown, the computer system 604 includes a central processing unit (CPU) 612, a memory 616, a bus 620, and input/output (I/O) interfaces 624. Further, the computer system 604 is shown in communication with external I/O devices/resources 628 and storage system 632. In general, the processing unit 612 executes computer program code, such as code to implement various components of the processes described above as illustrated in FIGS. 1-5. In the present embodiment, the memory 616 comprises a load calculator logic component 704 which enables the processing unit 612 to receive vehicle-mounted load sensor outputs and calculate loads imparted to the vehicle from the sensor outputs; a vehicle system evaluator logic component 706 which enables the processing unit 612 to evaluated present vehicle system configurations; a vehicle system operating mode selector logic component 708 which enables the processing unit 612 to alter and/or select vehicle system operating modes as a function of said evaluating; and an operator notifier logic component 712 which enables the processing unit 612 to notify a vehicle operator of a system configuration alteration or selection made by the processing unit 612 as provided above, and in some examples provide an opportunity to the vehicle operator to override a selection and/or force an alternative selection or configuration alteration through entering an appropriate input. Each of the logic components 704, 706, 708 and 712 which may be stored in the memory 616 and/or the storage system 632. It is to be appreciated that two or more, including all, of these components may be implemented as a single component.

While executing computer program code, the processing unit 612 can read and/or write data to/from the memory 616, the storage system 632, and/or the I/O interfaces 624. The bus 620 provides a communication link between each of the components in computer system 604. The external devices 628 can comprise any devices (e.g., keyboard, pointing device, display, etc.) that enable a user to interact with computer system 604 and/or any devices (e.g., network card, modem, etc.) that enable computer system 604 to communicate with one or more other computing devices.

The computer infrastructure 608 is only illustrative of various types of computer infrastructures for implementing the invention. For example, in one embodiment, computer infrastructure 608 comprises two or more computing devices (e.g., a server cluster) that communicate over a network to perform the various process steps of the invention. Moreover, computer system 604 is only representative of various possible computer systems that can include numerous combinations of hardware.

To this extent, in other embodiments, the computer system 604 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 612 may comprise a single processing unit, or be distributed across one or more processing units in one or more locations, e.g., on a client and server. Similarly, the memory 616 and/or the storage system 632 can comprise any combination of various types of data storage and/or transmission media that reside at one or more physical locations.

Further, I/O interfaces 624 can comprise any system for exchanging information with one or more of the external device 628. Still further, it is understood that one or more additional components (e.g., system software, math co-processing unit, etc.) not shown in FIG. 6 can be included in computer system 604. However, if computer system 604 comprises a handheld device or the like, it is understood that one or more of the external devices 628 (e.g., a display) and/or the storage system 632 could be contained within computer system 604, not externally as shown.

The storage system 632 can be any type of system (e.g., a database) capable of providing storage for information under the present invention. To this extent, the storage system 632 could include one or more storage devices, such as a magnetic disk drive or an optical disk drive. In another embodiment, the storage system 632 includes data distributed across, for example, a local area network (LAN), wide area network (WAN) or a storage area network (SAN) (not shown). In addition, although not shown, additional components, such as cache memory, communication systems, system software, etc., may be incorporated into computer system 604.

While shown and described herein as a method and a system, it is understood that the invention further provides various alternative embodiments. For example, in one embodiment, the invention provides a computer-readable/useable medium that includes computer program code to enable a computer infrastructure to sense vehicle loads and configure vehicles system. To this extent, the computer-readable/useable medium includes program code that implements each of the various process steps of the invention.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 616 (FIG. 6) and/or the storage system 632 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to manage vehicle load sensing and system configuration. In this case, the service provider can create, maintain, support, etc., a computer infrastructure, such as the computer infrastructure 608 (FIG. 6) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the vehicle load sensing and configuration system 100. In this case, a computer infrastructure, such as computer infrastructure 608 (FIG. 6), can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 202 (FIG. 2), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" of a plurality of elements, a "primary" distinguished from a "secondary," an "another", etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for sensing vehicle loads and responsively and automatically configuring a vehicle, comprising:
    sensing a vehicle load;
    providing a vehicle load sensing output to a vehicle-mounted programmable device;
    calculating a load imparted to the vehicle from the load sensing output;
    comparing the imparted load to at least one of a vehicle load capacity rating and a threshold;
    automatically adjusting a vehicle system into a revised operating mode in response to the compared imparted load meeting or exceeding at least one of the vehicle load capacity rating and the threshold, wherein the vehicle system is selected from the group comprising a vehicle cooling system, a vehicle transmission system, a vehicle braking system, a vehicle suspension system and a vehicle engine system;
    modifying a vehicle component or load trailer component;
    revising at least one of the vehicle load capacity rating and the threshold; and
    repeating sensing the vehicle load, calculating the load imparted, comparing the imparted load and automatically adjusting the vehicle system in response to the compared imparted load meeting or exceeding the revised at least one of the vehicle load capacity rating and the threshold.

2. The method of claim 1, wherein adjusting the vehicle system comprises modifying the vehicle component or the load trailer component, further comprising repeating the revising of the at least one vehicle load capacity rating or threshold, the sensing of the vehicle load, the calculating of the load imparted, the comparing of the imparted load and the adjusting of the vehicle system until a revised at least one vehicle load capacity rating or threshold is met.

3. The method of claim 2 wherein adjusting the vehicle system comprises progressively adjusting the vehicle system in proportion to an increase or decrease of the sensed load relative to a historic sensed load.

4. The method of claim 3 further comprising biasing the adjusting of the vehicle system to optimize a performance characteristic.

5. The method of claim 4 wherein the performance characteristic is selected from the group comprising vehicle system fuel efficiency, vehicle system power output, vehicle transmission control and vehicle engine emission reduction.

6. The method of claim 5 wherein biasing comprises optimizing a fuel efficiency of the vehicle system in response to loads sensed below an efficient load threshold or optimizing a vehicle system power output in response to loads sensed above a power load threshold.

7. The method of claim 5 wherein biasing comprises progressively optimizing a vehicle system power output at the expense of a vehicle system fuel efficiency in proportion to determined increases in sensed loads.

8. The method of claim 5, further comprising adjusting the vehicle system in response to an operating environment input.

9. The method of claim 5, further comprising:
    deploying a first load sensor in a first vehicle area and a second load sensor in a second vehicle area; and
    determining a vehicle load distribution by comparing the first and the second vehicle area load sensor inputs;
    wherein adjusting the vehicle system is responsive to the determined vehicle load distribution.

10. The method of claim 5, further comprising:
    notifying a supervisory entity of automatically adjusting the vehicle system into a revised operating mode; and
    the supervisory entity overriding the adjusting of the vehicle system into the revised operating mode.

11. An article of manufacture, comprising:
    a computer-readable tangible storage device having computer readable program code embodied therewith, the computer readable program code comprising instructions which, when executed on a computer system, cause the computer system to:
    calculate a load imparted to a vehicle from a vehicle-mounted load sensor output, wherein the vehicle-mounted load sensor senses a vehicle load;
    compare the imparted load to at least one of a vehicle load capacity rating and a threshold;
    automatically adjust a vehicle system into a revised operating mode in response to the compared imparted load meeting or exceeding the vehicle load capacity rating or the threshold, the vehicle system selected from the group comprising a vehicle cooling system, a vehicle transmission system, a vehicle braking system, a vehicle suspension system and a vehicle engine system;
    revise at least one of the vehicle load capacity rating and the threshold in response to a modification of a vehicle component or a load trailer component; and
    repeat calculating the load imparted from the vehicle-mounted load sensor output, comparing the imparted load and automatically adjusting the vehicle system into a revised operating mode in response to the compared imparted load meeting or exceeding the revised at least one of the vehicle load capacity rating and the threshold.

12. A method for deploying an application for sensing vehicle loads and responsively and automatically configuring a vehicle, comprising:

providing a computer infrastructure being operable to:

calculate a load imparted to a vehicle from a vehicle-mounted load sensor output, wherein the vehicle-mounted load sensor senses a vehicle load;

compare the imparted load to at least one of a vehicle load capacity rating and a threshold;

automatically adjust a vehicle system into a revised operating mode in response to the compared imparted load meeting or exceeding the vehicle load capacity rating or the threshold, the vehicle system selected from the group comprising a vehicle cooling system, a vehicle transmission system, a vehicle braking system, a vehicle suspension system and a vehicle engine system; and revise at least one of the vehicle load capacity rating and the threshold in response to a modification of a vehicle component or a load trailer component;

repeat calculating the load imparted from the vehicle-mounted load sensor output, comparing the imparted load and automatically adjusting the vehicle system into a revised operating mode in response to the compared imparted load meeting or exceeding the revised at least one of the vehicle load capacity rating and the threshold.

13. A system, comprising:

a processing unit, a computer readable memory and a computer-readable storage medium;

wherein the processing unit, when executing program instructions stored on the computer-readable storage medium via the computer readable memory:

calculates a load imparted to a vehicle from a load output from a vehicle-mounted load sensor that is configured to sense a vehicle load and provide the load sensor output;

compares the imparted load to at least one of a vehicle load capacity rating and a threshold, by:

providing a gross vehicle weight logic component that compares sensor load measurements to a gross weight rating threshold;

providing a trailer tongue weight logic component that compares a sensed hitch tongue weight load to a tongue weight threshold; and providing a trailer axle weight logic component that compares a sensed trailer cargo load to a trailer cargo weight threshold;

evaluates gross vehicle weight logic component, trailer tongue weight logic component and trailer axle weight logic component outputs for compliance with a vehicle and trailer combination weight rating of the at least one of the vehicle load capacity rating and the threshold; and automatically adjusts a vehicle system into a revised operating mode in response to the compared imparted load meeting or exceeding at least one of the vehicle load capacity rating and the threshold, wherein the vehicle system is selected from the group comprising a vehicle cooling system, a vehicle transmission system, a vehicle braking system, a vehicle suspension system and a vehicle engine system.

14. The system of claim 13 wherein the processing unit further adjusts the vehicle system progressively in proportion to an increase or decrease of the sensed load relative to a historic sensed load.

15. The system of claim 14 wherein the processing unit further adjusts bias of the vehicle system to optimize a performance characteristic.

16. The system of claim 15 wherein the performance characteristic is at least one of a vehicle system fuel efficiency, a vehicle system power output, a vehicle transmission control and an engine emission reduction.

17. The system of claim 16 wherein the processing unit further:

optimizes the vehicle system fuel efficiency in response to a load sensed below an efficient load threshold; or optimizes the vehicle system power output in response to a load sensed above a power load threshold.

18. The system of claim 17 wherein the processing unit further progressively optimizes the vehicle system power output at the expense of the vehicle system fuel efficiency in response to a proportionate increase in a sensed load.

19. The system of claim 16 wherein the processing unit further adjusts the vehicle system in response to an operating environment input.

20. The system of claim 16, further comprising a first load sensor in a first vehicle area and a second load sensor in a second vehicle area;

wherein the processing unit further determines a vehicle load distribution by comparing the first and the second vehicle area load sensor inputs, and adjusts the vehicle system responsive to the determined vehicle load distribution.

21. The system of claim 16 wherein the processing unit further notifies a vehicle operating entity of adjusting the vehicle system, and overrides said adjusting in response to an override input.

22. The system of claim 16, wherein the processing unit further:

revises at least one of the vehicle load capacity rating and the threshold in response to a modification of a vehicle component or a load trailer component; and repeats calculating the load imparted from the vehicle-mounted load sensor output, comparing the imparted load and automatically adjusting the vehicle system into a revised operating mode in response to the compared imparted load meeting or exceeding the revised at least one of the vehicle load capacity rating and the threshold.

* * * * *